(12) United States Patent
Aston et al.

(10) Patent No.: US 9,878,808 B2
(45) Date of Patent: Jan. 30, 2018

(54) SPACECRAFT AND SPACECRAFT RADIATOR PANELS WITH COMPOSITE FACE-SHEETS

(71) Applicant: The Boeing Company, Huntington Beach, CA (US)

(72) Inventors: Richard W. Aston, Brea, CA (US); Anna Maria Tomzynska, Seal Beach, CA (US)

(73) Assignee: The Boeing Company, Huntington Beach, CA (US)

( * ) Notice: Subject to any disclaimer, the term of this patent is extended or adjusted under 35 U.S.C. 154(b) by 372 days.

(21) Appl. No.: 14/592,609

(22) Filed: Jan. 8, 2015

(65) Prior Publication Data

US 2016/0200459 A1    Jul. 14, 2016

(51) Int. Cl.
| | |
|---|---|
| *B64G 1/52* | (2006.01) |
| *B64G 1/50* | (2006.01) |
| *B23P 15/26* | (2006.01) |
| *B64G 1/14* | (2006.01) |
| *F28D 15/02* | (2006.01) |
| *F28F 21/02* | (2006.01) |
| *F28F 21/08* | (2006.01) |

(52) U.S. Cl.
CPC .............. *B64G 1/503* (2013.01); *B23P 15/26* (2013.01); *B64G 1/14* (2013.01); *B64G 1/506* (2013.01); *F28D 15/0275* (2013.01); *F28F 21/02* (2013.01); *F28F 21/081* (2013.01)

(58) Field of Classification Search
None
See application file for complete search history.

(56) References Cited

U.S. PATENT DOCUMENTS

| | | | | |
|---|---|---|---|---|
| 6,378,809 B1 * | 4/2002 | Pon | ........................ | B64G 1/503 244/171.8 |
| 7,036,772 B2 * | 5/2006 | Walker | .................... | B64G 1/222 244/171.8 |
| 8,820,684 B2 * | 9/2014 | McKinnon | ............... | B64G 1/50 244/171.8 |

(Continued)

FOREIGN PATENT DOCUMENTS

| | | |
|---|---|---|
| CN | 1172751 | 2/1998 |
| DE | 10340092 | 5/2005 |

(Continued)

OTHER PUBLICATIONS

European Patent Office, Extended European Search Report on related European Patent Application No. 15196461, dated Jun. 9, 2016.

(Continued)

*Primary Examiner* — Medhat Badawi
(74) *Attorney, Agent, or Firm* — Dascenzo Intellectual Property Law, P.C.

(57) ABSTRACT

Radiator panels include two spaced-apart face-sheets including an inside face-sheet and an outside face-sheet that are constructed of a fiber reinforced composite material, a honeycomb core positioned between the two spaced-apart face-sheets, and one or more heat pipes extending through the honeycomb core. Spacecraft include a body and two radiator panels operatively coupled to the body opposite each other.

12 Claims, 3 Drawing Sheets

(56) References Cited

U.S. PATENT DOCUMENTS

| | | | | |
|---|---|---|---|---|
| 2002/0145082 | A1* | 10/2002 | Bertheux | B64G 1/503 244/172.6 |
| 2004/0188568 | A1* | 9/2004 | Gayrard | F28D 15/043 244/171.8 |
| 2004/0232284 | A1* | 11/2004 | Tjiptahardja | B64G 1/503 244/171.8 |
| 2005/0211850 | A1* | 9/2005 | Sebata | B64G 1/503 244/171.8 |
| 2007/0221787 | A1* | 9/2007 | McKinnon | B64G 1/503 244/171.8 |
| 2010/0019093 | A1* | 1/2010 | Russell | B64D 47/00 244/171.8 |
| 2010/0243817 | A1* | 9/2010 | McKinnon | B64G 1/50 244/171.8 |
| 2012/0125571 | A1 | 5/2012 | Lutz et al. | |
| 2014/0239124 | A1 | 8/2014 | Aston et al. | |
| 2015/0280329 | A1* | 10/2015 | Sanford | H01Q 1/06 343/786 |
| 2016/0101591 | A1* | 4/2016 | Khan | B29D 99/0025 428/113 |
| 2016/0153493 | A1* | 6/2016 | Henninger | D02G 3/447 384/42 |
| 2016/0318261 | A1* | 11/2016 | Storer | B29C 70/465 |

FOREIGN PATENT DOCUMENTS

| | | |
|---|---|---|
| DE | 102005039783 | 3/2007 |
| EP | 2388195 | 11/2011 |

OTHER PUBLICATIONS

Machine generated English translation of the abstract of EP 2388195, downloaded from Espacenet.com on Jun. 9, 2016.

Machine generated English translation of the abstract of DE 102005039783, downloaded from Espacenet.com on Jun. 9, 2016.

Machine generated English translation of the abstract of DE 10340092, downloaded from Espacenet.com on Jun. 9, 2016.

Machine generated English translation of the abstract of CN 1172751, downloaded from Espacenet.com on Jul. 17, 2017.

State Intellectual Property Office of the P.R.C., Office Action and Search Report on related Chinese Patent Application No. 2016100089724, dated Jun. 7, 2017.

English translation of State Intellectual Property Office of the P.R.C., Office Action and Search Report on related Chinese Patent Application No. 2016100089724, dated Jun. 7, 2017.

\* cited by examiner

SPACECRAFT AND SPACECRAFT RADIATOR PANELS WITH COMPOSITE FACE-SHEETS

FIELD

The present disclosure relates to spacecraft radiators.

BACKGROUND

Spacecraft include a plethora of equipment, such as electronic equipment, that generates heat. This heat must be dissipated, and because space is essentially void of air, the heat must be radiated to outer space. Spacecraft, such as satellites, typically include radiator panels that draw the heat from electronics and other equipment to an outer surface of the spacecraft. Thermal expansion and contraction of a radiator panel may affect the precision of a spacecraft's communication equipment's pointing to Earth and/or to another spacecraft or other object in outer space. For some spacecraft, the precise pointing of communication equipment is critical to its function. Historically, radiator panels have been constructed of materials that have similar coefficients of thermal expansion (CTE) so as to minimize distortions of the radiator panels due to thermal imbalance and thus to minimize the effect on the pointing of communication equipment. Additionally, radiator panels historically have been used as a ground, or power return, for electronic equipment, including communication equipment, that is supported by radiator panels. Accordingly, radiator panels historically have been constructed with aluminum honeycomb cores sandwiched between aluminum face-sheets and with aluminum heat pipes extending through the cores.

SUMMARY

Radiator panels for spacecraft, methods of assembling radiator panels for spacecraft, spacecraft, and methods of assembling spacecraft are disclosed herein. Radiator panels include two spaced-apart face-sheets including an inside face-sheet and an outside face-sheet that are constructed of a fiber reinforced composite material, a honeycomb core positioned between the two spaced-apart face-sheets, and one or more heat pipes extending through the honeycomb core. In some radiator panels, the fiber reinforced composite material of the face-sheets includes two different types of fibers. In some radiator panels, the fiber reinforced composite material of the face-sheets includes carbon fibers and boron fibers. Spacecraft include a body and two radiator panels operatively coupled to the body opposite each other.

DESCRIPTION

Figure 1:
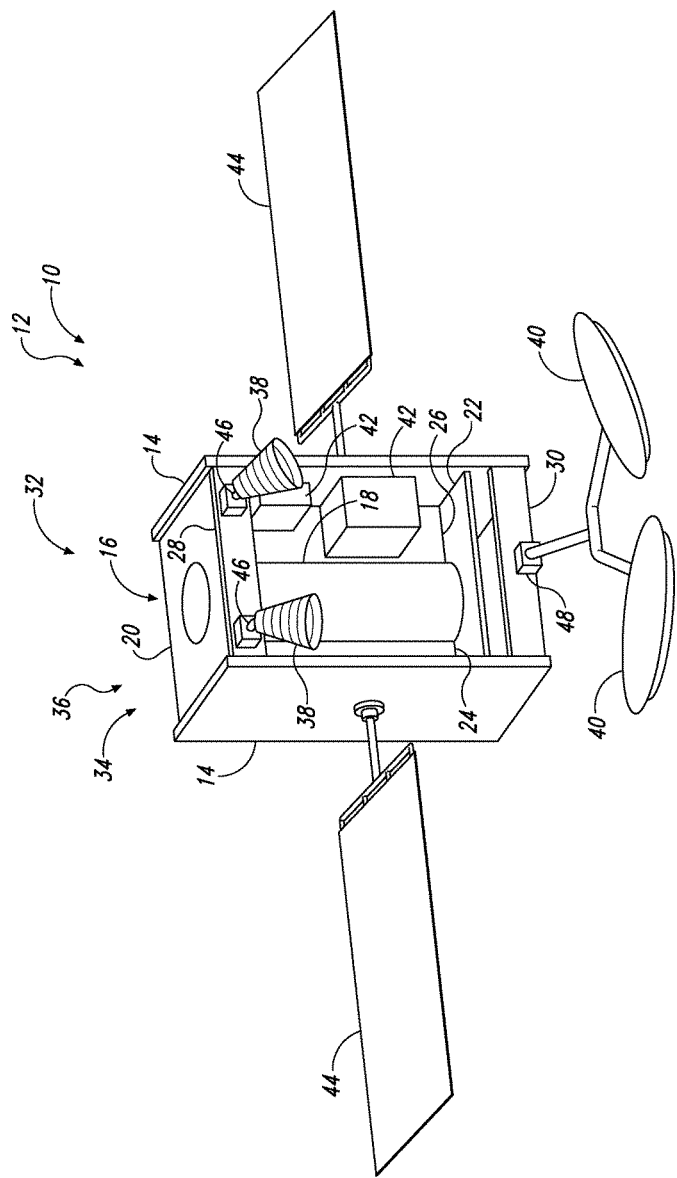
FIG. 1 is an isometric view of an example spacecraft that includes two radiator panels according to the present disclosure.

Radiator panels for spacecraft, methods of assembling radiator panels for spacecraft, spacecraft, and methods of assembling spacecraft are disclosed herein. FIG. 1 illustrates an example spacecraft 10 in the form of a satellite 12 that includes two radiator panels 14. However, other types of spacecraft 10 are within the scope of the present disclosure, and radiator panels 14 are not limited to being used with satellites, let alone the example satellite 12 illustrated in FIG. 1 and described herein. Spacecraft 10 and satellites 12 include a structural body 16 to which the radiator panels 14 and other equipment are operatively mounted. In the illustrated example of satellite 12, the structural body 16 includes a cylindrical core 18, an upper panel 20, a lower panel 22, a left stiffener 24, a right stiffener 26, an upper antenna bracket 28, and a lower antenna bracket 30. The radiator panels 14 include a left radiator panel 14 that is operatively coupled to the upper panel 20, the left stiffener 24, the lower panel 22, the upper antenna bracket 28, and the lower antenna bracket 30, and a right radiator panel 14 that is operatively coupled to the upper panel 20, the right stiffener 26, the lower panel 22, the upper antenna bracket 28, and the lower antenna bracket 30. Collectively, the radiator panels 14 and the body 16 of the satellite 12 may be described as a spacecraft bus 32, with the bus 32 being used to carry various payloads 34 into outer space. The illustrated and described construction of bus 32 is but one example of a spacecraft 10 and satellite 12, which is provided for illustration purposes only and does not limit the present disclosure to the illustrated example. Additional examples of construction that may be suitable for a spacecraft bus 32 are disclosed in U.S. Patent Application Publication No. 2014/0239124, the disclosure of which is incorporated herein by reference.

The payload 34 of a spacecraft 10 and satellite 12 may take any suitable form and configuration depending on the ultimate application of the spacecraft 10. For example, payload 34 may include various communication devices 36, including (but not limited to) antenna feeds 38 and antenna reflectors 40. At a minimum, payload 34 of a satellite 12 typically includes electronic equipment 42 that is operatively mounted to the inner sides of the radiator panels 14. Accordingly, heat generated by the electronic equipment is conducted to the radiator panels 14, which in turn radiate the heat to outer space. Payload 34 additionally may include structures that are mounted to the outer sides of the radiator panels 14, such as (but not limited to) solar arrays 44, as illustrated in FIG. 1.

Because the radiator panels 14 define structural components of satellite 12, their thermal stability may be critical to ensure that communication devices 36 function as desired. For example, the position of a first communication device, such as in the form of an antenna feed 38, relative to the position of a second communication device, such as in the form of an antenna reflector 40 at which the an antenna feed 38 is pointed, may be critical for the effectiveness of the communication devices and thus the satellite 12. A bus 32, including radiator panels 14, therefore may be configured to maintain a desired positional relationship between two communication devices 36 even when the radiator panels 14 are subject to significant thermal changes. This desired positional relationship may be described in terms of the movement of the attachment points of the communication devices to the bus 32. Using the antenna example, an antenna feed 38 may be coupled relative to the body 16 at a first mount 46, and an antenna reflector 40 may be coupled relative to the body 16 at a second mount 48. When one or both of the radiator panels 14 of a satellite 12 is subject to a temperature change between a minimum temperature and a maximum temperature in the range of one or more of −50-100° C., −20-100° C., −20-80° C., 0-100° C., 10-100° C., 20-100° C., 50-100° C., and/or 20-80° C., the first mount may move, rotate, or pivot, relative to the second mount by less than 0.1 degrees, by less than 0.08 degrees, by less than 0.06 degrees, or by less than 0.04 degrees. Any combination of the aforementioned ranges is within the scope of the present disclosure. Additionally or alternatively, when one or both of the radiator panels 14 begin dissipating heat at a rate in the range of one or more of 100-5000 Watts, 100-2500 Watts, 500-5000 Watts, and/or 500-2500 Watts, that is, go from zero Watts to within one of the enumerated ranges, the first mount may move, rotate, or pivot relative to the second mount by less than 0.1 degrees, by less than 0.08 degrees, by less than 0.06 degrees, or by less than 0.04 degrees. Any combination of the aforementioned ranges is within the scope of the present disclosure. As an illustrative, non-exclusive example, when a radiator panel 14 is dissipating heat at a rate in the range of 100-5000 Watts and/or is subject to a temperature change between a minimum temperature and a maximum temperature in the range of −50-100° C., the first mount may move, rotate, or pivot by less than 0.1 degrees.

Figure 2:
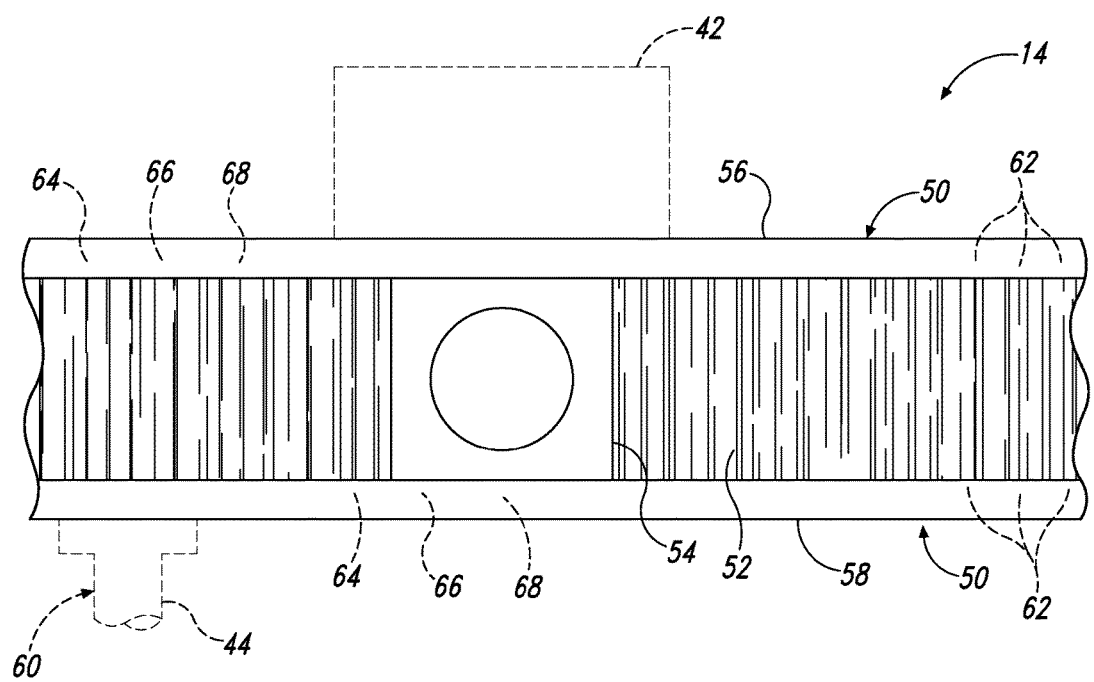
FIG. 2 is a schematic profile view representing radiator panels according to the present disclosure.

Turning now to FIG. 2, examples of radiator panels 14 are schematically represented. Although not required, radiator panels 14 are generally planar and rectangular. Radiator panels 14 include two spaced-apart face-sheets 50, a honeycomb core 52 that is positioned between the face-sheets 50, and one or more heat pipes 54 that extend through the honeycomb core 52 between the face-sheets 50. The face-sheets 50 include an inside face-sheet 56 that faces the inside of a bus 32 when installed as a component of the bus, and an outside face-sheet 58 that faces the outside of the bus toward outer space. The honeycomb core 52 gives the radiator panel structural support. The one or more heat pipes 54 draw heat from electronic equipment 42 mounted to the inside face-sheet 56 and transfer the heat to the outside face-sheet 58 to be radiated to outer space. As optionally and schematically illustrated in FIG. 2, one or more structures 60 also may be mounted to the outside face-sheet 58, with a solar array 44 being an example.

Honeycomb cores 52 are structures that are defined by a plurality of thin wall sections, or ligaments, that define hollow cells. Typically, although not required in all examples, the cells are hexagonal in cross-section. The honeycomb core 52 of a radiator panel 14 may be constructed of any suitable material, including metal, plastic, and reinforced composite material. A typical example of a metal includes aluminum. Typical examples of non-metallic materials include carbon fiber, phenolic, and aramid materials. As used herein, a "reinforced composite material" refers to a material that includes a polymer or other binding material matrix together with a filler. The filler may be fibers, particulates, or other configurations of material depending on the desired properties of the reinforced composite material. Moreover, the filler may be ordered, such as woven fibers or longitudinally aligned fibers, or the filler may be disordered, such as randomly ordered. Examples of filler include (but are not limited to) carbon particles, carbon fibers, boron fibers, polyaramid fibers, glass fibers, and/or other particles and/or fibers.

Heat pipes 54 are heat transfer devices that typically rely on phase transition of a working fluid to transfer heat from one location to another. Heat pipes may be constructed of any suitable material, but typically are constructed of a metal, such as aluminum, due to its heat transfer characteristics and density.

Face-sheets 50 of a radiator panel are constructed at least in part, and in some examples completely, of a fiber reinforced composite material. In some examples, the face-sheets 50 may be constructed as a laminate of multiple plies 62 of material. For example, a face-sheet 50 may include 2-10, 2-8, 2-6, 2-4, 4-10, 4-8, 4-6, 6-10, 6-8, or 8-10 plies 62 of material; however, other numbers of plies 62 may be included in a face-sheet 50, including numbers fewer than, greater than, and within the enumerated ranges. Additionally or alternatively, a face-sheet 50 may include at least one metallic foil layer, such as an aluminum foil layer. In some examples, a face-sheet 50 may have a thickness in the range of 200-1000 µm, 200-800 µm, 200-600 µm, 200-400 µm, 400-1000 µm, 400-800 µm, 400-600 µm, 600-1000 µm, 600-800 µm, or 800-1000 µm; however, other thickness of face-sheets 50 also are within the scope of the present disclosure. Any combination of the aforementioned ranges is within the scope of the present disclosure. For example, a face-sheet 50 may include 2-10 plies 62 resulting in a thickness of the face-sheet 50 in the range of 200-1000 µm.

Figure 3:
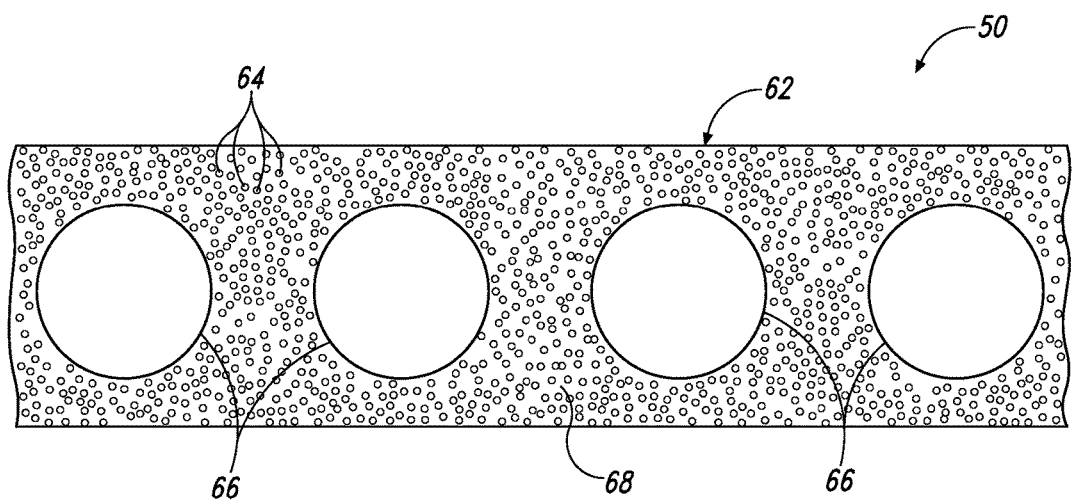
FIG. 3 is a schematic profile view representing a single ply of a face-sheet of a radiator panel according to the present disclosure.

FIG. 3 schematically represents example plies 62 of fiber reinforced composite materials that may be used to construct a face-sheet 50.

In some examples of face-sheets 50, the fiber reinforced composite material may include a set of fibers 64 and a set of fibers 66 within a matrix of binding material 68, and with fibers 64 differing in one or more properties or characteristics from fibers 66.

For example, in some examples of face-sheets 50, the average diameter of fibers 64 may differ from an average diameter of fibers 66. As examples, the average diameter of fibers 66 may be at least 2, at least 4, at least 6, at least 8, 2-10, 2-8, 2-6, 2-4, 4-10, 4-8, 4-6, 6-10, 6-8, or 8-10 times the average diameter of fibers 64. Additionally or alternatively, the average diameter of fibers 64 may be in the range of 5-20 µm, 5-15 µm, 5-10 µm, 10-20 µm, 10-15 µm, or 15-20 µm, and the average diameter of fibers 66 may be in the range of 50-200 µm, 50-150 µm, 50-100 µm, 100-200 µm, 100-150 µm, or 150-200 µm. Other average diameters, as well as ratios of average diameters, are within the scope of the present disclosure. Any combination of the aforementioned ranges is within the scope of the present disclosure. For example, the average diameter of fibers 66 may be at least 2 times the average diameter of fibers 64 and have an average diameter in the range of 5-20 µm.

In some examples of face-sheets 50, fibers 64 may be carbon fibers. In some examples of face-sheets 50, fibers 66 may be boron fibers.

In some examples of face-sheets 50, a ratio of a total number of fibers 64 to a total number of fibers 66 within a face-sheet 50 and/or a ply 62 may be in the range of 100-500, 100-400, 100-300, 100-200, 200-500, 200-400, 200-300, 300-500, 300-400, or 400-500; however, other ratios, including ratios within the enumerated ranges, as well as below and above the enumerated ranges, may be utilized in a face-sheet 50 and/or a ply 62 thereof.

In some examples of face-sheets 50, within a single ply 62, fibers 64 may be spaced apart on average in the range of 0-30 µm, 0-20 µm, 0-10 µm, 10-30 µm, 10-20 µm, or 20-30 µm. In some examples of face-sheets, within a single ply 62, fibers 66 may be spaced apart on average in the range of 50-200 µm, 50-150 µm, 50-100 µm, 100-200 µm, 100-150 µm, or 150-200 µm. Any ratio of any one of the aforementioned ranges for fibers 64 to any one of the aforementioned ranges for fibers 66 is within the scope of the present disclosure. For example, within a single ply 62, fibers 64 may be spaced apart on average in the range of 0-30 µm, and fibers 66 may be spaced apart on average in the range of 50-200 μm. Moreover, other spacings, including within the enumerated ranges, as well as below and above the enumerated ranges, may be utilized in a ply 62 of a face-sheet 50.

In some examples of face-sheets 50, fibers 64 may have a coefficient of thermal expansion in the range of −0.8-0 ppm/° F. In some examples of face-sheets 50, fibers 66 may have a coefficient of thermal expansion in the range of 2-3 ppm/° F. Any combination of the aforementioned range for fibers 64 and the aforementioned range for fibers 66 may be used.

In some examples of face-sheets 50, fibers 64 may have a thermal conductivity in the range of 75-1100 W/m-K. In some examples of face-sheets 50, fibers 66 may have a thermal conductivity in the range of 25-400 W/m-K. Any combination of the aforementioned range for fibers 64 and the aforementioned range for fibers 66 may be used.

In some examples of face-sheets 50, fibers 64 may have a tension strength in the range of 400-800 ksi. In some examples of face-sheets 50, fibers 66 may have a tension strength in the range of 500-600 ksi. Any combination of the aforementioned range for fibers 64 and the aforementioned range for fibers 66 may be used.

In one example of face-sheets 50, fibers 64 have a coefficient of thermal expansion in the range of −0.8-0 ppm/° F. and have a tension strength in the range of 400-800 ksi, and fibers 66 have a coefficient of thermal expansion in the range of 2-3 ppm/° F. and a tension strength in the range of 500-600 ksi. A spacecraft 10 having two radiator panels 14 constructed with such an example of face-sheets 50 and with communication devices operatively mounted thereto via mounts 46, 48 results in desired, and critical, pointing of the communication devices. For example, when the radiator panels are subjected to a temperature change between a minimum temperature and a maximum temperature in the range of −20-80° C. or when the radiator panels begin dissipating heat at a rate in the range of 500-2500 Watts, movement of one mount relative to the other mount is less than 0.08 degrees.

In some examples of face-sheets 50, the binding material 68 of the fiber reinforced composite material of a face-sheet 50 or a ply 62 thereof may include epoxy, cyanate ester, polyimide, bismaleimide resin, or phenolic resin. Additionally or alternatively, the binding material 68 also may include a thermal conductivity enhancer, such as one or more of milled carbon fiber, carbon nanotubes, and graphite nanoplatelets.

As discussed above, the face-sheets 50, the honeycomb core 52, and the heat pipes 54 of a radiator panel 14 may have various properties and characteristics depending on a particular example of radiator panel 14. As a result, the properties and characteristics of a radiator panel 14, as a whole, also may vary.

In some examples of radiator panels 14, the radiator panel, as a whole, may have a coefficient of thermal expansion in the range of 0.5-13 ppm/° F. across its thickness. Additionally or alternatively, the radiator panel, as a whole, may have a coefficient of thermal expansion in the range of 0.25-4 ppm/° F. in a direction parallel to the face-sheets 50.

Figure 4:
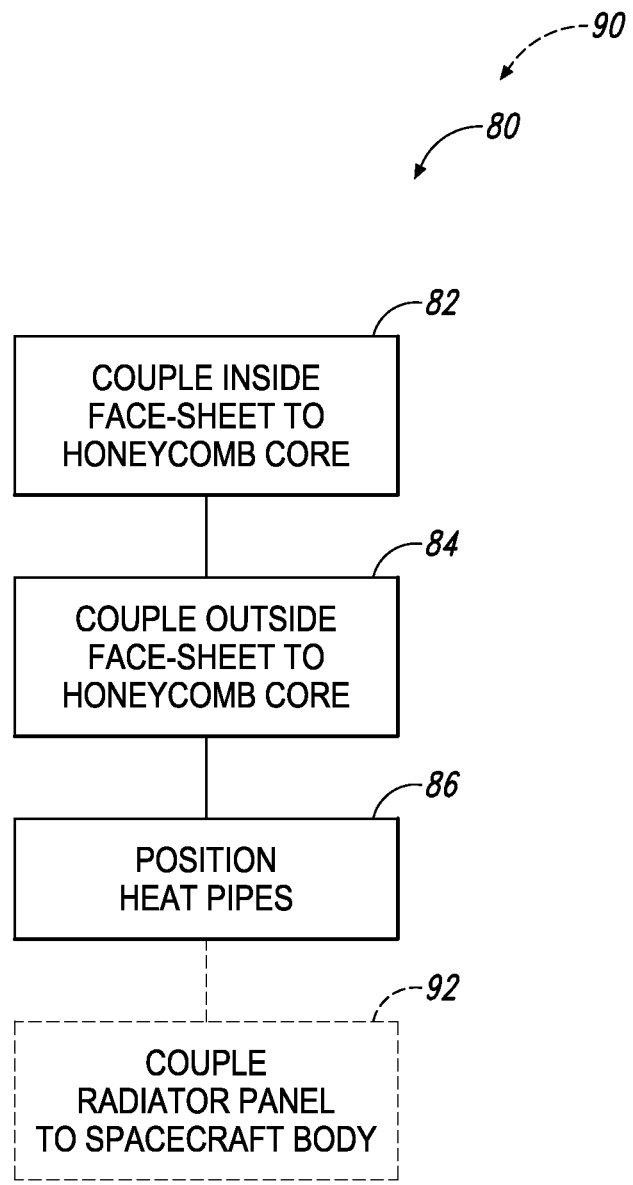
FIG. 4 is a flowchart schematically representing methods according to the present disclosure.

FIG. 4 schematically provides a flowchart that represents illustrative, non-exclusive examples of methods according to the present disclosure. In FIG. 4, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 4 are not limiting and other methods and steps are within the scope of the present disclosure, including methods having greater than or fewer than the number of steps illustrated, as understood from the discussions herein.

As schematically illustrated in solid boxes in FIG. 4, methods 80 of assembling a radiator panel 14 for a spacecraft 10 include operatively coupling an inside face-sheet 56 to a honeycomb core 52, as indicated at 82, operatively coupling an outside face-sheet 58 to the honeycomb core 52 opposite the inside face-sheet 56, as indicated at 84, and operatively positioning one or more heat pipes 54 between the inside face-sheet 56 and the outside face-sheet 58, as indicated at 86.

Methods 90 of assembling a spacecraft 10 also are within the scope of the present disclosure, and as indicated in FIG. 4 at 92 may include at least operatively coupling a radiator panel 14 to a body 16 of the spacecraft 10. Some methods 90 also may include performing a method 80 of assembling the radiator panel 14 prior to the coupling 92.

Illustrative, non-exclusive examples of inventive subject matter according to the present disclosure are described in the following enumerated paragraphs:

A. A radiator panel for a spacecraft, the radiator panel comprising:

two spaced-apart face-sheets including an inside face-sheet and an outside face-sheet, wherein the two spaced-apart face-sheets are constructed of a fiber reinforced composite material;

a honeycomb core positioned between the two spaced-apart face-sheets; and one or more heat pipes extending through the honeycomb core.

A1. The radiator panel of paragraph A, wherein the honeycomb core is constructed of metal, optionally of aluminum.

A2. The radiator panel of any of paragraphs A-A1, wherein the one or more heat pipes are constructed of metal, optionally of aluminum.

A3. The radiator panel of any of paragraphs A-A2, wherein the fiber reinforced composite material includes a first set of fibers and a second set of fibers, wherein the fibers of the first set differ from the fibers of the second set in at least one characteristic.

A3.1. The radiator panel of paragraph A3, wherein the first set of fibers includes fibers having a first average diameter, and wherein the second set of fibers includes fibers having a second average diameter that is different than the first average diameter.

A3.1.1. The radiator panel of paragraph A3.1, wherein the second average diameter is at least 2, at least 4, at least 6, at least 8, 2-10, 2-8,2-6, 2-4,4-10, 4-8,4-6, 6-10, 6-8, or 8-10 times the first average diameter.

A3.1.2. The radiator panel of any of paragraphs A3.1-A3.1.1, wherein the first average diameter is in the range of 5-20 μm, 5-15 μm, 5-10 μm, 10-20 μm, 10-15 μm, or 15-20 μm.

A3.1.3. The radiator panel of any of paragraphs A3.1-A3.1.2, wherein the second average diameter is in the range of 50-200 μm, 50-150 μm, 50-100 μm, 100-200 μm, 100-150 μm, or 150-200 μm.

A3.2. The radiator panel of any of paragraphs A3-A3.1.3, wherein the fibers of the first set comprise, optionally consist essentially of, optionally consist of, carbon fibers, and wherein the fibers of the second set do not comprise carbon fibers.

A3.3. The radiator panel of any of paragraphs A3-A3.2, wherein the fibers of the second set comprise, optionally consist essentially of, optionally consist of, boron fibers, and wherein the fibers of the first set do not comprise boron fibers.

A3.4. The radiator panel of any of paragraphs A3-A3.3, wherein a ratio of a total number of the first set of fibers to a total number of the second set of fibers is in the range of 100-500, 100-400, 100-300, 100-200, 200-500, 200-400, 200-300, 300-500, 300-400, or 400-500.

A3.5. The radiator panel of any of paragraphs A3-A3.4, wherein within a single ply of the fiber reinforced composite material, fibers of the first set of fibers are spaced apart on average in the range of 0-30 μm, 0-20 μm, 0-10 μm, 10-30 μm, 10-20 μm, or 20-30 μm.

A3.6. The radiator panel of any of paragraphs A3-A3.5, wherein within a/the single ply of the fiber reinforced composite material, fibers of the second set of fibers are spaced apart on average in the range of 50-200 μm, 50-150 μm, 50-100 μm, 100-200 μm, 100-150 μm, or 150-200 μm.

A3.7. The radiator panel of any of paragraphs A3-A3.6, wherein the first set of fibers includes fibers having a coefficient of thermal expansion in the range of −0.8-0 ppm/° F.

A3.8. The radiator panel of any of paragraphs A3-A3.7, wherein the second set of fibers includes fibers having a coefficient of thermal expansion in the range of 2-3 ppm/° F.

A3.9. The radiator panel of any of paragraphs A3-A3.8, wherein the first set of fibers includes fibers having a thermal conductivity in the range of 75-1100 W/m-K.

A3.10. The radiator panel of any of paragraphs A3-A3.9, wherein the second set of fibers includes fibers having a thermal conductivity in the range of 25-400 W/m-K.

A3.11. The radiator panel of any of paragraphs A3-A3.10, wherein the first set of fibers includes fibers having a tension strength in the range of 400-800 ksi.

A3.12. The radiator panel of any of paragraphs A3-A3.11, wherein the second set of fibers includes fibers having a tension strength in the range of 500-600 ksi.

A4. The radiator panel of any of paragraphs A-A3.12, wherein the inside face-sheet includes, optionally consists essentially of, optionally consists of, 2-10, 2-8, 2-6, 2-4, 4-10, 4-8, 4-6, 6-10, 6-8, or 8-10 plies of the fiber reinforced composite material.

A4.1. The radiator panel of paragraph A4, wherein the inside face-sheet further includes at least one metallic foil layer, optionally an aluminum foil layer.

A5. The radiator panel of any of paragraphs A-A4.1, wherein the outside face-sheet includes, optionally consists essentially of, optionally consists of, 2-10, 2-8, 2-6, 2-4, 4-10, 4-8, 4-6, 6-10, 6-8, or 8-10 plies of the fiber reinforced composite material.

A5.1. The radiator panel of paragraph A4, wherein the outside face-sheet further includes at least one metallic foil layer, optionally an aluminum foil layer.

A6. The radiator panel of any of paragraphs A-A5.1, wherein the inside face-sheet has a thickness in the range of 200-1000 μm, 200-800 μm, 200-600 μm, 200-400 μm, 400-1000 μm, 400-800 μm, 400-600 μm, 600-1000 μm, 600-800 μm, or 800-1000 μm.

A7. The radiator panel of any of paragraphs A-A6, wherein the outside face-sheet has a thickness in the range of 200-1000, 200-800, 200-600, 200-400, 400-1000, 400-800, 400-600, 600-1000, 600-800, or 800-1000 μm.

A8. The radiator panel of any of paragraphs A-A7, wherein the fiber reinforced composite material includes a binding material that includes, optionally consists essentially of, optionally consists of, epoxy, cyanate ester, polyimide, bismaleimide resin, or phenolic resin.

A8.1. The radiator panel of paragraph A8, wherein the binding material further includes a thermal conductivity enhancer, optionally one or more of milled carbon fiber, carbon nanotubes, and graphite nanoplatelets.

A9. The radiator panel of any of paragraphs A-A8.1, wherein the radiator panel, as a whole, has a coefficient of thermal expansion in the range of 0.5-13 ppm/° F. across its thickness.

A10. The radiator panel of any of paragraphs A-A9, wherein the radiator panel, as a whole, has a coefficient of thermal expansion in the range of 0.25-4 ppm/° F. in a direction parallel to the inside face-sheet and the outside face-sheet. A11. The radiator panel of any of paragraphs A-A10, wherein the radiator panel is generally planar.

A12. The radiator panel of any of paragraphs A-A11, wherein the radiator panel is generally rectangular.

A13. The use of the radiator panel of any of paragraphs A-A12 as a structural component of a spacecraft.

A14. The use of the radiator panel of any of paragraphs A-A13 to improve the precision of communication devices of a spacecraft.

B. A spacecraft, comprising:
a body; and
two radiator panels of any of paragraphs A-A12 operatively coupled to the body opposite each other.

B1. The spacecraft of paragraph B, further comprising:
a first communication device operatively coupled relative to the body by a first mount; and
a second communication device operatively coupled relative to the body by a second mount.

B1.1. The spacecraft of paragraph B1, wherein the first communication device and the second communication device are electrically grounded to the two radiator panels.

B1.2. The spacecraft of any of paragraphs B1-B1.1, wherein when one or both of the two radiator panels is subject to a temperature change between a minimum temperature and a maximum temperature in the range of −50-100° C., −20-100° C., −20-80° C., 0-100° C., 10-100° C., 20-100° C., 50-100° C., or 20-80° C., the first mount moves, rotates, or pivots relative to the second mount by less than 0.1 degrees, 0.08 degrees, 0.06 degrees, or 0.04 degrees.

B1.3. The spacecraft of any of paragraphs B1-B1.2, wherein when one or both of the radiator panels begins dissipating heat at a rate in the range of 100-5000 Watts, 100-2500 Watts, 500-5000 Watts, or 500-2500 Watts, the first mount moves, rotates, or pivots relative to the second mount by less than 0.1 degrees, 0.08 degrees, 0.06 degrees, or 0.04 degrees.

B2. The spacecraft of any of paragraphs B-B1.3, wherein the first communication device includes an antenna feed, wherein the second communication device includes an antenna reflector, and wherein the antenna feed is pointed at the antenna reflector.

B3. The spacecraft of any of paragraphs B-B2, wherein the spacecraft is free of one or more of star tracker mounts, stand-alone antenna mounts, and sensor suite optical bench mounts.

B4. The use of the spacecraft of any of paragraphs B-B3, optionally as a communications satellite.

C. A method of assembling a radiator panel for a spacecraft, the method comprising:
operatively coupling an inside face-sheet to a honeycomb core;
operatively coupling an outside face-sheet to the honeycomb core opposite the inside face-sheet; and operatively positioning one or more heat pipes between the inside face-sheet and the outside face-sheet;

wherein the inside face-sheet, the outside face-sheet, and/or the one or more heat pipes include the subject matter of any of paragraphs A-A12.

D. A method of assembling a spacecraft, the method comprising:

operatively coupling a radiator panel to a body of the spacecraft, wherein the radiator panel includes the subject matter of any of paragraphs A-A12, and wherein the spacecraft includes the subject matter of any of paragraphs B-B3.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A spacecraft, comprising:
    a body;
    two radiator panels of operatively coupled to the body opposite each other;
    a first mount operatively coupled to the body;
    a first communication device operatively coupled relative to the body by the first mount;
    a second mount operatively coupled to the body and spaced apart from the first mount; and
    a second communication device operatively coupled relative to the body by the second mount;
    wherein each of the two radiator panels comprises:
        two spaced-apart face-sheets including an inside face-sheet and an outside face-sheet, wherein the two spaced-apart face-sheets are constructed of a fiber reinforced composite material constructed as a laminate of multiple plies, wherein the fiber reinforced composite material includes a first set of fibers and a second set of fibers, wherein the fibers of the first set differ from the fibers of the second set in at least one characteristic, wherein single plies of the multiple plies include fibers of the first set of fibers and fibers of the second set of fibers, wherein the first set of fibers includes fibers having a coefficient of thermal expansion in the range of −0.8-0 ppm/° F., wherein the second set of fibers includes fibers having a coefficient of thermal expansion in the range of 2-3 ppm/° F., wherein the first set of fibers includes fibers having a tension strength in the range of 400-800 ksi, and wherein the second set of fibers includes fibers having a tension strength in the range of 500-600 ksi;
        a honeycomb core positioned between the two spaced-apart face-sheets; and
        one or more heat pipes extending through the honeycomb core;
    wherein when one or both of the two radiator panels is subject to a temperature change between a minimum temperature and a maximum temperature in the range of −20-80° C., the first mount moves relative to the second mount by less than 0.08 degrees as a result of the temperature change; and
    wherein when one or both of the radiator panels begins dissipating heat at a rate in the range of 500-2500 Watts, the first mount moves relative to the second mount by less than 0.08 degrees as a result of the dissipating heat.

2. The spacecraft of claim 1, wherein the first set of fibers includes fibers having a first average diameter, wherein the second set of fibers includes fibers having a second average diameter, and wherein the second average diameter is at least 8 times the first average diameter.

3. The spacecraft of claim 1, wherein the first set of fibers includes fibers having a first average diameter, wherein the second set of fibers includes fibers having a second average diameter that is different than the first average diameter, wherein the first average diameter is in the range of 5-20 μm, and wherein the second average diameter is in the range of 50-200 μm.

4. The spacecraft of any claim 1, wherein the first set of fibers comprises carbon fibers, and wherein the second set of fibers comprises boron fibers.

5. The spacecraft of claim 1, wherein a ratio of a total number of the first set of fibers to a total number of the second set of fibers is in the range of 100-500.

6. The spacecraft of claim 1, wherein within a single ply of the fiber reinforced composite material, fibers of the first set are spaced apart on average in the range of 0-30 μm, and wherein within the single ply of the fiber reinforced composite material, fibers of the second set are spaced apart in the range of 50-200 μm.

7. The spacecraft of claim 1, wherein the first set of fibers includes fibers having a thermal conductivity in the range of 75-1100 W/m-K, and wherein the second set of fibers includes fibers having a thermal conductivity in the range of 25-400 W/m-K.

8. The spacecraft of claim 1, wherein the fiber reinforced composite material includes a binding material that includes a thermal conductivity enhancer.

9. The spacecraft of claim 1, wherein the radiator panel, as a whole, has a coefficient of thermal expansion in the range of 0.5-13 ppm/° F. across its thickness.

10. The spacecraft of claim 1, wherein each of the two radiator panels, as a whole, has a coefficient of thermal expansion in the range of 0.25-4 ppm/° F. in a direction parallel to its respective inside face-sheet and its respective outside face-sheet.

11. The spacecraft of claim 1,
    wherein the first communication device and the second communication device are electrically grounded to the two radiator panels.

12. The spacecraft of claim 1, wherein the first communication device includes an antenna feed, wherein the second communication device includes an antenna reflector, and wherein the antenna feed is pointed at the antenna reflector.

\* \* \* \* \*